United States Patent
Waeller et al.

(10) Patent No.: US 9,459,116 B2
(45) Date of Patent: Oct. 4, 2016

(54) DISPLAY METHOD FOR A DISPLAY SYSTEM, DISPLAY SYSTEM AND OPERATING METHOD FOR A NAVIGATION SYSTEM OF A VEHICLE

(75) Inventors: Christoph Waeller, Braunschweig (DE); Matthias Heimermann, Wolfenbüttel (DE)

(73) Assignee: VOLKSWAGEN AG, Wolfsburg (DE)

( * ) Notice: Subject to any disclaimer, the term of this patent is extended or adjusted under 35 U.S.C. 154(b) by 1142 days.

(21) Appl. No.: 12/994,616

(22) PCT Filed: Apr. 20, 2009

(86) PCT No.: PCT/EP2009/002868
§ 371 (c)(1),
(2), (4) Date: Dec. 20, 2010

(87) PCT Pub. No.: WO2009/143941
PCT Pub. Date: Dec. 3, 2009

(65) Prior Publication Data
US 2011/0106446 A1 May 5, 2011

(30) Foreign Application Priority Data
May 26, 2008 (DE) .................. 10 2008 025 122

(51) Int. Cl.
*G01C 21/30* (2006.01)
*G01C 21/36* (2006.01)
(Continued)

(52) U.S. Cl.
CPC .......... *G01C 21/3664* (2013.01); *B60K 35/00* (2013.01); *B60K 37/06* (2013.01);
(Continued)

(58) Field of Classification Search
CPC .................. B60K 35/00; B60K 37/06; B60K 2350/1012; B60K 2350/1024; G01C 21/3664; G01C 21/367; G06F 3/0488; G06F 3/04883
USPC ......... 701/409, 410, 400; 345/156, 168, 173
See application file for complete search history.

(56) References Cited

U.S. PATENT DOCUMENTS 5,686,940 A * 11/1997 Kuga .................. G06F 3/04897
345/156
5,731,979 A * 3/1998 Yano .................. G01C 21/3664
340/995.15

(Continued)

FOREIGN PATENT DOCUMENTS

DE  10 2005 035111   9/2006
EP  1 349 052        10/2003
(Continued)

OTHER PUBLICATIONS

International Search Report and Written Opinion, PCT/EP2009/002868, dated Aug. 20, 2009.
(Continued)

*Primary Examiner* — Shardul Patel
(74) *Attorney, Agent, or Firm* — Kenyon & Kenyon LLP

(57) ABSTRACT

A display system includes a display for the graphic representation of changeable information, an operating unit for the control of the displayed information by a user, a proximity sensor which is arranged to detect an approach of the user to the operating unit, and a control unit. The control unit is coupled to the display, the operating unit and the proximity sensor. The control unit is arranged such that, as a function of an approach of the user to the operating unit, it alters the representation of the changeable information, such that a time rate of display change of the graphic representation of the changeable information is reduced.

9 Claims, 2 Drawing Sheets

(51) Int. Cl.
  *B60K 35/00* (2006.01)
  *B60K 37/06* (2006.01)
  *G06F 3/0488* (2013.01)
(52) U.S. Cl.
  CPC ......... *G01C 21/367* (2013.01); *G06F 3/0488* (2013.01); *B60K 2350/1012* (2013.01); *B60K 2350/1024* (2013.01)

(56) References Cited

U.S. PATENT DOCUMENTS

| | | | |
|---|---|---|---|
| 6,278,940 B1* | 8/2001 | Endo | G01C 231/3611 340/988 |
| 7,084,859 B1 | 8/2006 | Pryor | |
| 7,292,228 B2* | 11/2007 | Nagasaka | G01C 21/3664 345/168 |
| 7,567,222 B2* | 7/2009 | Tanaka | B60K 35/00 345/173 |
| 2004/0085352 A1 | 5/2004 | Nagasaka et al. | |
| 2005/0253753 A1* | 11/2005 | Lalik | G01C 21/20 342/357.31 |
| 2007/0236475 A1 | 10/2007 | Wherry | |
| 2007/0263999 A1* | 11/2007 | Keam | G03B 15/03 396/155 |
| 2007/0294639 A1 | 12/2007 | Van Berkel et al. | |
| 2008/0006762 A1 | 1/2008 | Fadell et al. | |
| 2008/0278455 A1* | 11/2008 | Atkins | G06F 3/04883 345/173 |
| 2009/0021491 A1 | 1/2009 | Kawamura | |
| 2009/0251423 A1* | 10/2009 | Jung | G06F 3/0488 345/173 |
| 2011/0202862 A1* | 8/2011 | Kramer | B60K 35/00 715/771 |

FOREIGN PATENT DOCUMENTS

| | | |
|---|---|---|
| EP | 1 988 448 | 11/2008 |
| JP | 5-165403 | 7/1993 |
| WO | WO 2006/054207 | 5/2006 |
| WO | WO 2007/097414 | 8/2007 |
| WO | WO 2009/010114 | 1/2009 |

OTHER PUBLICATIONS

Search Report, German Patent Application No. 10 2008 025 122.4, dated Aug. 7, 2008.

International Preliminary Report on Patentability, issued in corresponding International Application No. PCT/EP2009/002868.

* cited by examiner

DISPLAY METHOD FOR A DISPLAY SYSTEM, DISPLAY SYSTEM AND OPERATING METHOD FOR A NAVIGATION SYSTEM OF A VEHICLE

FIELD OF THE INVENTION

The present invention relates to a display method for a display system and a corresponding display system, as well as, in particular, an operating method for a navigation system of a vehicle.

BACKGROUND INFORMATION

In navigation systems in vehicles such as passenger cars or trucks, for example, map representations of an area surrounding the vehicle are displayed on a display system in the vehicle. The map representation includes roads in the vicinity of the vehicle, a symbolic representation of the vehicle as well as its position and orientation, and further "points of interest" (POI) which mark facilities or positions on the map that are of interest for the vehicle driver, such as hotels, gas stations, restaurants, toll stations and so forth. While the vehicle is traveling, the map representation is usually altered in such a way that the position of the host vehicle is always located at the same position in the display system, despite its changing geographical position, and the remaining objects in the map representation such as the roads and POIs change their position on the display system accordingly. This ensures an easy orientation of the driver with the aid of the map representation.

The objects such as POIs or roads, for example, shown on the map representation, may provide further information or functionalities that are able to be called up or actuated by a user of the system, if needed. Thus, for instance, a POI that represents a hotel may supply further information, e.g., with respect to room rates, room amenities and room availability, or may provide a functionality for setting up a telephone connection to the hotel or a functionality for programming the address of the hotel as a destination address of the navigation system.

For example, a user of the navigation system may interact with the map representation of the navigation system via a touch-sensitive screen, referred to as a touchscreen, of the navigation system. In order to call up additional information or functionalities of an object shown on the map representation, it is then only necessary to touch the object on the map representation with a finger, for instance. Since, as described above, the objects or POIs move on the map representation while the vehicle is traveling, the challenge placed on the eye-hand coordination of the operator to strike these moving targets is increased. Particularly if the system is operated by the driver of the vehicle, false hits thus occur increasingly, and the time glancing at the display system is increased, which means the vehicle driver is distracted from the events occurring in road traffic. Moreover, these movable objects may move out of the display area of the display system before the driver or the operator has been able to select the destination.

Similar problems exist not only when working with the map representations on a navigation system described above, but also in the case of a multitude of applications in the vehicle with what are referred to as animated displays that change as a function of a movement of the vehicle or as a function of information changing over time.

SUMMARY

Example embodiments of the present invention provide a display and operating method for a display system that avoids the previously described problems when selecting objects of a graphic representation, that is, ensures a higher hit probability and at the same time helps to reduce the duration of the glance by the driver at the display system, to thereby reduce distraction from road traffic and to increase traffic safety.

According to example embodiments of the present invention, a display method is provided for a display system. The display system includes a display for the graphic representation of changeable information and an operating unit for the control of the displayed information by a user. For instance, the operating unit may include a touch-sensitive surface, a so-called touchscreen, of the display. The display method includes detection of an approach of the user to the operating unit and alteration of the graphic representation as a function of the detected approach to the operating unit. The graphic representation is altered such that a time rate of display change of the graphic representation is reduced. A reduction of the time rate of display change of the graphic representation means, for example, that the largest possible portion of the graphic representation on the display system is shown unaltered over time. On one hand, a graphic representation altered in this manner permits the user, after turning away briefly from the display system in order to look at the road in front of him, for example, to quickly orient himself again in the graphic representation on the display system, since only small changes have taken place in the graphic representation in the meantime. Moreover, it is made easier for the user to touch movable objects on the graphic representation which, due to the decreased display change, now move only slowly or no longer move at all.

The approach of the user to the surface of the display may be detected with the aid of a proximity sensor, for example. In this manner, the time rate of display change of the graphic representation may already be reduced before the user actually touches the operating unit, so that the time rate of display change of the graphic representation may already be reduced prior to a control or selection of the displayed information.

According to example embodiments of the present invention, the display system may include a display system of a navigation system of a vehicle. In this case, the changeable information includes a representation of a geographical map of an area surrounding the vehicle and the position of the vehicle on the geographical map. If no approach of the user to the operating unit is now detected, the vehicle is shown at a predetermined location on the display, and the display change includes the change in the representation of the geographical map as a function of a movement of the vehicle. For example, the vehicle may be shown centrally on the display in a predetermined direction, so that the representation of the geographical map is shown shifted and rotated on the display as a function of the movement of the vehicle. If an approach of the user below a predetermined distance to the operating unit is detected, the geographical map is shown unaltered on the display, and instead, the vehicle is shown variably on the display as a function of a movement of the vehicle. In this manner, objects of the map representation such as a hotel or a restaurant, for instance, together with the map representation remain motionless on the display in response to the approach of the user, thereby making it easy to select these objects. Furthermore, the position of the host vehicle continues to be apparent with the aid of the display system.

Moreover, the display system may also include an optional further display system of a vehicle that includes an "animated graphic representation" in which an object of the graphic representation may be selected by a user via the operating unit in order, for instance, to call up further functionalities of the object. The animated graphic representation may change as a function of a movement of the vehicle, for example, or as a function of information changing over time.

According to example embodiments, the display change may include the representation of the geographical map as a function of a movement of the vehicle and the representation of the vehicle as a function of a movement of the vehicle, if an approach of the user above the predetermined distance and below a further predetermined distance to the operating unit is detected. In this case, the display change of the representation of the geographical map is already reduced in response to an approach of the user to the operating unit above the predetermined distance, so that acquisition of the information of the geographical map, such as a road routing or a position of a hotel or restaurant, for example, is simplified, since the geographical map now moves more slowly on the display. In order to continue to correctly show the instantaneous position of the vehicle, the position of the vehicle is changed on the display, as well.

According to example embodiments of the present invention, in addition, an operating method for a navigation system of a vehicle is provided. The navigation system includes a display for the graphic representation of changeable information and an operating unit for the control of the displayed information by a user. The changeable information includes a geographical map of an area surrounding the vehicle and the position of the vehicle on this geographical map. The operating method includes selection of a display mode with the aid of the operating unit. A normal mode or a pause mode may be selected as display mode. In the normal mode, the vehicle is shown at a predetermined location on the display, and the geographical map is shown variably on the display as a function of a movement of the vehicle. On the other hand, in the pause mode, the geographical map is shown unaltered on the display, and the vehicle is shown variably on the display as a function of a movement of the vehicle.

In the normal mode, the user of the navigation system receives a clear representation of the movement of his vehicle along a predetermined route, that is, the instantaneous surrounding area of the vehicle. Because in the normal mode, the vehicle is shown at a predetermined location in a predetermined orientation on the display, an intuitive representation of the route and the surrounding area of the vehicle in the direction of travel of the vehicle is shown to the user. In this context, the geographical map moves and rotates on the display as a function of the movement of the vehicle. In order to select an object such as a hotel or restaurant or another POI on the geographical map, the user may change to the pause mode, which means the representation of the geographical map remains unchanged from now on, and instead, the movement of the vehicle is shown as a change in the position and orientation of the vehicle on the display. This makes it easier for the user to select an object on the geographical map such as a hotel or a restaurant in order, for example, to query further information regarding this object or to input this object as a new destination address into the navigation system.

According to example embodiments, the operating method may further include a return-travel mode, which shows the geographical map as a film sequence as a function of a travel path previously covered by the vehicle. Furthermore, the operating method may also include a pre-travel mode, which shows the geographical map as a film sequence as a function of a planned travel path, e.g., of a route calculated for the vehicle by the navigation system. Due to the additional display modes for a pre-travel and a return travel, respectively, the user is permitted in an easy manner to look at already-transited or future route sections of the traveled or planned route in order, for example, in conjunction with the pause mode, to access objects on the geographical map which are no longer or not yet in the present segment of the display.

For instance, the operating unit may include a touch-sensitive surface of the display. In this manner, with the aid of predetermined areas of the touch-sensitive surface of the display, the different display modes such as normal mode, pause mode, etc., may be selected by touching these predetermined areas. Moreover, it is also possible to access the objects of the geographical map by the touch-sensitive surface of the display.

The operating method may further include the previously described display method in order to alter the graphic representation as a function of a detected approach of the user to the operating unit.

Finally, according to example embodiments of the present invention, a display system is provided which includes a display for the graphic representation of changeable information, an operating unit for the control of the displayed information by a user, a proximity sensor for detecting an approach of the user to the operating unit, and a control unit. The control unit is coupled to the display, the operating unit and the proximity sensor. The control unit is arranged such that, as a function of an approach of the user to the operating unit, it alters the representation of the changeable information such that a time rate of display change of the graphic representation of the changeable information is reduced. Moreover, the display system may be arranged to implement the method described above, and therefore includes the previously described advantages, as well.

Example embodiments of the present invention are explained in the following description, with reference to the drawing.

DETAILED DESCRIPTION

Figure 1:
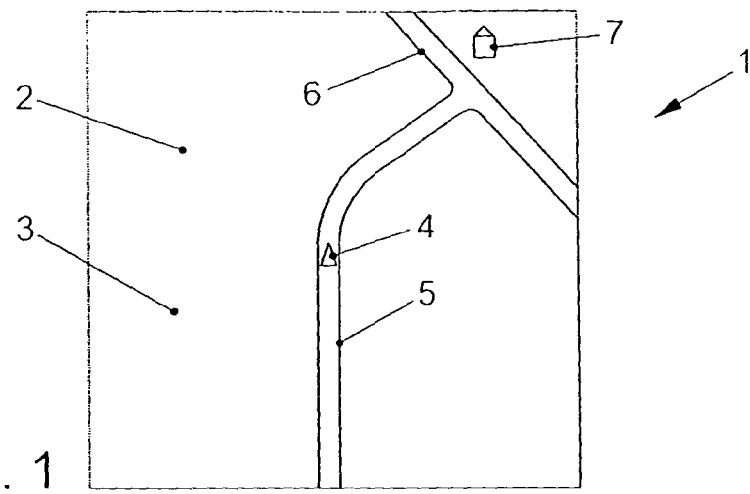
FIG. 1 shows a display system according to an example embodiment the present invention, which portrays a geographical map and a position of a vehicle on the geographical map.

FIG. 1 shows a display system 1, which includes a display 2 and an operating unit 3 in the form of a touch-sensitive surface of display 2. Display system 1 also includes a proximity sensor (not shown), which is arranged to detect an approach of, for example, a finger of a user into the proximity of display 2. Display 2 of display system 1 is arranged such that information of a navigation system, for instance, may be represented graphically. For example, FIG. 1 shows the representation of a segment of a geographical map which includes two roads 5 and 6 as well as a building 7 of special interest such as a hotel or a restaurant. Also shown on display 2 is a symbol 4 which represents the position and orientation of the host vehicle with respect to the segment of the geographical map. In the present case, symbol 4 is an arrow which represents the orientation of the vehicle in the case of forward driving in the direction of the arrow.

Display system 1 is arranged such that if no approach of the user to operating unit 3 is detected by the proximity sensor, the position and orientation of vehicle symbol 4 remains unchanged in relation to display 2, that is, vehicle symbol 4 is disposed substantially in the middle of display 2, and points upwards with its arrowhead in FIG. 1. In response to a movement of the vehicle, the graphic representation on display 2 is altered to the effect that the map segment is rotated and/or shifted in accordance with the vehicle movement, so that the positioning and orientation of vehicle symbol 4 remain unaltered.

Figure 2:
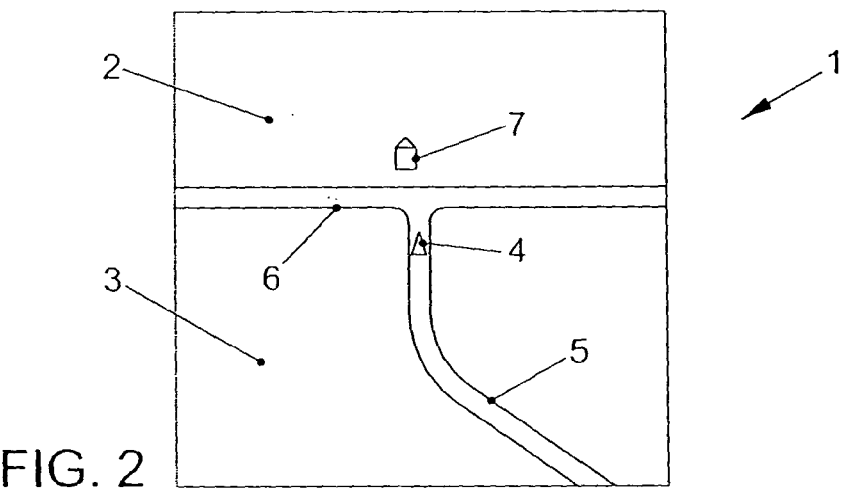
FIG. 2 shows the display system of FIG. 1 having a representation of the geographical map altered as a function of a movement of the vehicle.

FIG. 2 shows the graphic representation of display system 1 of FIG. 1 after the vehicle has moved along road 5 in the direction of road 6. The map segment was rotated and shifted accordingly, the position and orientation of vehicle symbol 4 being unchanged relative to display 2. On the other hand, the position of building 7, together with the map segment, i.e., roads 5 and 6, has changed correspondingly.

Figure 3:
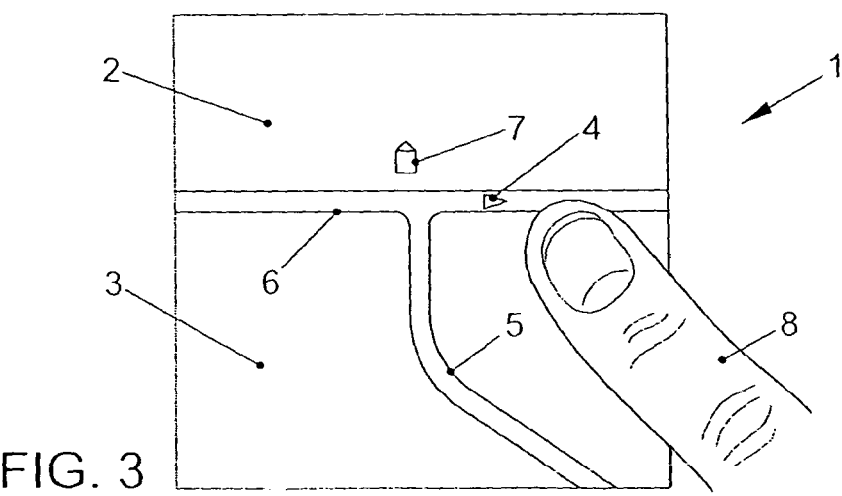
FIG. 3 shows the display system of FIG. 2 having a representation of the vehicle on the geographical map, the representation being altered as a function of a movement of the vehicle.

Display system 1 is further arranged such that, for example, it is able to obtain and display further information with regard to building 7 on instruction by a user of display system 1. To that end, building 7 must be touched with the aid of a stylus or a finger of the user on touch-sensitive operating unit 3 of display 2. However, as described in connection with FIGS. 1 and 2, since the position of building 7 changes on display 2 as the vehicle is traveling, display system 1 detects an approach of the stylus or of the finger of the user to operating unit 3 with the aid of the proximity sensor. As soon as an approach to operating unit 3 has been detected, the graphic representation on display 2 is altered to the effect that the representation of the map segment now remains unchanged, and vehicle symbol 4 moves and/or rotates on display 2 as a function of the movement of the vehicle. As shown in FIG. 3, a finger 8 of the user has been moved into the vicinity of operating unit 3, and the graphic representation of the geographical map, that is, the representation of roads 5 and 6 as well as of building 7, is unchanged compared to the representation of FIG. 2, although the vehicle has moved further. The movement of the vehicle continues to be represented via a change in the position and orientation of vehicle symbol 4 on display 2, as shown in FIG. 3. It is now easily possible to touch the representation of building 7 on display 2, since the position of building 7 on display 2 is unchanging.

Alternatively, upon the approach of finger 8 to display 2, the speed with which the representation of the map segment moves may also be reduced as a function of the distance of finger 8 from display 2, and at the same time, the position of vehicle symbol 4 may be shown variably on display 2 as a function of the vehicle position. If the distance between finger 8 and display 2 drops below a minimum, then, as described in connection with FIG. 3, the map segment is shown unaltered and only vehicle symbol 4 is moved on display 2.

If finger 8 or a corresponding pointing device is removed from display 2, then, as described in FIGS. 1 and 2, the map segment is shown again such that the vehicle symbol is again located centrally in display 2 and is oriented upwards. Alternatively, from the type of display in FIG. 3, the type of display in FIG. 1 or 2 may also be assumed again if an operating sequence, e.g., the selection of building 7 for an information query or as destination for a route calculation by the navigation system has been completed. As an alternative, it is possible to switch between the previously described types of display of the map segment and of the vehicle symbol with the aid of operating elements of operating unit 3, these operating elements taking the form of touch-sensitive surfaces of display 2, for example.

Figure 4:
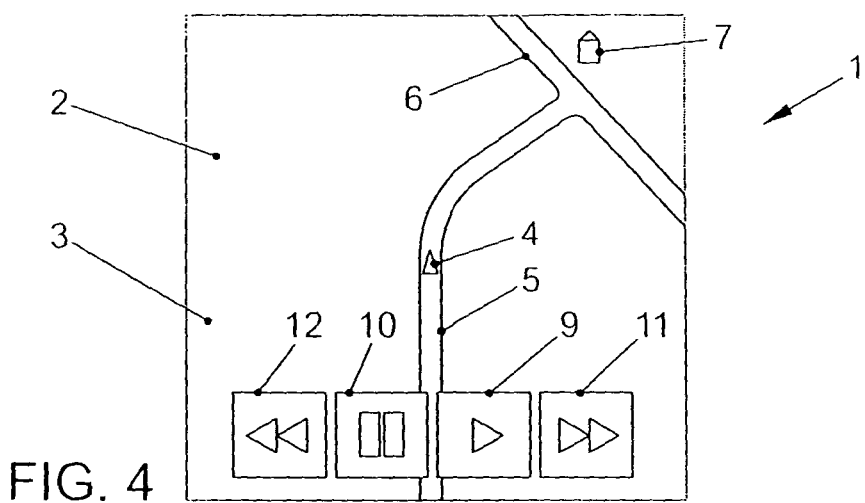
FIG. 4 shows the display system of FIG. 1, with additional operating elements for setting a display mode.

FIG. 4 shows a display system 1 in which operating elements 9-12 are provided on touch-sensitive operating unit 3 with the aid of display 2. After operating element 9 has been actuated, display system 1 is switched to a display operating mode which is also referred as normal mode and which corresponds to the display operating mode described in connection with FIG. 1. In this normal mode, the orientation and position of vehicle symbol 4 within display 2 is unchangeable, and the map segment is adjusted according to the movement of the vehicle. By actuating operating element 10, display system 1 is able to be switched to a "pause mode" that corresponds substantially to the type of display described in connection with FIG. 2. The map segment which is shown on display 2 remains unchanged in the pause mode, and the position and orientation of vehicle symbol 4 changes according to the movement of the vehicle.

The example embodiment shown in FIG. 4 includes two further operating elements 11 and 12, that are used to set two further display modes of display system 1. By actuating operating element 11, what is termed a pre-travel mode is set. In this mode, a future movement of the vehicle is shown on display 2 in time lapse according to a route planned, for instance, with the aid of a navigation system. The representation takes place similarly as described in connection with FIG. 1, that is, the position of vehicle symbol 4 is unchanging and substantially in the middle of display 2, and the map segment shown on display 2, which includes roads 5, 6 and building 7, for example, moves according to the planned movement of the vehicle in time lapse.

Further operating elements for adjusting the speed of the time lapse may be provided on operating unit 3. For example, a timeline may be provided, which makes setting available for the exact chronological selection of a map segment. With the aid of operating element 12, the display system may be set to a "return-travel mode." In this return-travel mode, a route traveled by the vehicle in the past is represented in time lapse on display 2, comparable to the pre-travel mode. By actuating operating element 10 during the pre-travel mode or the return-travel mode, the respective mode may be retained, so that objects on the map shown at this instant are able to be selected or actuated like, for example, building 7 shown in the figure.

LIST OF REFERENCE NUMERALS

1 Display system
2 Display
3 Operating unit
4 Vehicle symbol
5, 6 Road
7 Building
8 The user's finger
9-12 Operating element

What is claimed is:
1. A display method for a display system, the display system including a display adapted for graphic representa- tion of changeable information and an operating unit adapted for control of displayed information by a user, comprising:

detecting an approach of the user to the operating unit; and altering the graphic representation as a function of the detected approach to reduce a time rate of display change of the graphic representation; wherein the display system includes a display system of a navigation system of a vehicle, the changeable information including a representation of a geographical map of an area surrounding the vehicle and position of the vehicle on the geographical map; wherein if no approach of the user to the operating unit is detected, the vehicle is shown at a predetermined location on the display, and the display change include the representation of the geographical map as a function of a movement of the vehicle; and wherein if an approach of the user below a predetermined distance to the operating unit is detected, the geographical map is shown unchanged on the display, and the display change includes a representation of the vehicle as a function of a movement of the vehicle.

2. The display method according to claim 1, wherein the operating unit includes a touch-sensitive surface of the display, and the approach of the user to the surface of the display is detected by a proximity sensor.

3. The display method according to claim 1, wherein if an approach of the user above the predetermined distance and below a further predetermined distance to the operating unit is detected, the display change includes the representation of the geographical map as a function of a movement of the vehicle, and the representation of the vehicle as a function of a movement of the vehicle.

4. An operating method for a navigation system of a vehicle, the navigation system including a display adapted for graphic representation of changeable information and an operating unit adapted for control of displayed information by a user, the changeable information including a representation of a geographical map of an area surrounding the vehicle and a position of the vehicle on the geographical map, comprising: selecting a display mode with the aid of the operating unit from a group of display modes that includes a normal mode and a pause mode; in the normal mode, showing the position of the vehicle in a predetermined location on the display and showing the geographical map variably on the display as a function of a movement of the vehicle; in the pause mode, showing the geographical map unchanged on the display from the fixed representation centered on the location of the vehicle at the time the pause mode was selected and showing the position of the vehicle variably on the display as a function of a movement of the vehicle; detecting an approach of the user to the operating unit; and altering the graphic representation as a function of the detected approach to reduce a time rate of display change of the graphic representation.

5. The operating method according to claim 4, wherein the group of display modes further includes a return-travel mode, the method further comprising, in the return-travel mode, showing the geographical map as a film sequence as a function of a travel path previously covered by the vehicle.

6. The operating method according to claim 4, wherein the group of display modes further includes a pre-travel mode, the method further comprising, in the pre-travel mode, showing the geographical map as a film sequence as a function of a planned travel path of the vehicle.

7. The operating method according to claim 4, wherein the operating unit includes a touch-sensitive surface of the display.

8. A display system, comprising: a display adapted for graphic representation of changeable information; an operating unit adapted for control of displayed information by a user; a proximity sensor adapted to detect an approach of the user to the operating unit; and a control unit coupled to the display, the operating unit, and the proximity sensor, the control unit adapted to alter, as a function of an approach of the user to the operating unit, the representation of the changeable information to reduce a time rate of display change of the graphic representation of the changeable information; wherein the display system includes a display system of a navigation system of a vehicle, the changeable information including a representation of a geographical map of an area surrounding the vehicle and position of the vehicle on the geographical map; wherein if no approach of the user to the operating unit is detected, the vehicle is shown at a predetermined location on the display, and the display change include the representation of the geographical map as a function of a movement of the vehicle; and wherein if an approach of the user below a predetermined distance to the operating unit is detected, the geographical map is shown unchanged on the display, and the display change includes a representation of the vehicle as a function of a movement of the vehicle.

9. The display system according to claim 8, wherein the display system is adapted to perform a method including: detecting an approach of the user to the operating unit; and altering the graphic representation as a function of the detected approach to reduce the time rate of display change of the graphic representation.

* * * * *